US010737673B2

(12) United States Patent
Nakaoka

(10) Patent No.: US 10,737,673 B2
(45) Date of Patent: Aug. 11, 2020

(54) ELECTRIC-BRAKE CONTROLLER AND VEHICLE BRAKE SYSTEM

(71) Applicant: TOYOTA JIDOSHA KABUSHIKI KAISHA, Toyota-shi, Aichi-ken (JP)

(72) Inventor: Hiroshi Nakaoka, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 3 days.

(21) Appl. No.: 16/186,672

(22) Filed: Nov. 12, 2018

(65) Prior Publication Data
US 2019/0152451 A1    May 23, 2019

(30) Foreign Application Priority Data

Nov. 20, 2017   (JP) ................................ 2017-222916

(51) Int. Cl.
| | |
|---|---|
| *B60T 13/66* | (2006.01) |
| *B60T 8/176* | (2006.01) |
| *B60T 8/48* | (2006.01) |
| *B60T 13/74* | (2006.01) |
| *B60T 7/04* | (2006.01) |

(Continued)

(52) U.S. Cl.
CPC .............. *B60T 8/176* (2013.01); *B60T 7/042* (2013.01); *B60T 8/4081* (2013.01); *B60T 8/4836* (2013.01); *B60T 13/662* (2013.01); *B60T 13/74* (2013.01); *B60T 13/741* (2013.01);
(Continued)

(58) Field of Classification Search
CPC ........ B60T 7/042; B60T 8/172; B60T 13/662; B60T 13/746; F16D 65/18

USPC ......... 188/72.6–72.9, 156–164; 303/3, 7, 15, 303/20; 701/70–72
See application file for complete search history.

(56) References Cited

U.S. PATENT DOCUMENTS

| | | | | |
|---|---|---|---|---|
| 2004/0104618 A1* | 6/2004 | Yamamoto | .............. | B60T 7/042 303/20 |
| 2010/0320042 A1* | 12/2010 | Giering | .................. | F16D 65/18 188/162 |

(Continued)

FOREIGN PATENT DOCUMENTS

| | | |
|---|---|---|
| JP | 2002-104152 A | 4/2002 |
| JP | 2003-104195 A | 4/2003 |

(Continued)

*Primary Examiner* — Christopher P Schwartz
(74) *Attorney, Agent, or Firm* — Sughrue Mion, PLLC

(57) ABSTRACT

An electric-brake controller includes an antilock controller configured to control a pressing force of an electric brake. The electric brake includes a pressing member that is advanced by rotation of an electric motor in a forward direction to press a friction member against a brake rotation member. The electric brake includes a return spring that applies a spring force such that the pressing member is moved away from the brake rotation member. The antilock controller includes a pressing-force reducer that reduces the pressing force. The pressing-force reducer includes: a reverse-rotation-current supplier that supplies reverse-rotation current for rotating the electric motor in a reverse direction for a reverse-rotation-current supply time; and a forward-rotation-current supplier that supplies forward-rotation current, for rotating the electric motor in the forward direction, to the electric motor after the reverse-rotation current is supplied for the reverse-rotation-current supply time.

11 Claims, 11 Drawing Sheets

(51) Int. Cl.
*B60T 8/40* (2006.01)
*B60T 17/22* (2006.01)
*B60T 8/26* (2006.01)

(52) U.S. Cl.
CPC .............. *B60T 17/22* (2013.01); *B60T 8/267* (2013.01); *B60T 2270/10* (2013.01)

(56) References Cited

U.S. PATENT DOCUMENTS

| | | | | |
|---|---|---|---|---|
| 2016/0032995 A1* | 2/2016 | Nishino | ................ | F16D 55/225 |
| | | | | 188/72.3 |
| 2016/0091039 A1* | 3/2016 | Masuda | ................... | F16D 65/18 |
| | | | | 188/72.1 |
| 2018/0162333 A1* | 6/2018 | Nakaoka | ............... | B60T 13/746 |
| 2018/0162334 A1 | 6/2018 | Masuda | | |
| 2018/0194334 A1* | 7/2018 | Masuda | ................ | B60T 8/1761 |

FOREIGN PATENT DOCUMENTS

| | | |
|---|---|---|
| JP | 2005-247306 A | 9/2005 |
| JP | 2008-265730 A | 11/2008 |
| JP | 2014-226007 A | 12/2014 |
| JP | 2017-035976 A | 2/2017 |

\* cited by examiner

| ACTUAL LOAD / DEVIATION | 1 | ... | Fp | Fi | ... | n | ... |
|---|---|---|---|---|---|---|---|
| 1 | ad11/td11 | | adp1/tdp1 | adi1/tdi1 | | adn1/tdn1 | |
| ⋮ | | | | | | | |
| y(Fj−Fk) | ad1y/td1y | | adpy/tdpy | adiy/tdiy | | adny/tdny | |
| x(Fi−Fj) | ad1x/td1x | | adpx/tdpx | adix/tdix | | adnx/tdnx | |
| ⋮ | | | | | | | |
| m | ad1m/td1m | | adpm/tdpm | adim/tdim | | adnm/tdnm | |
| ⋮ | | | | | | | | th = Ts−td

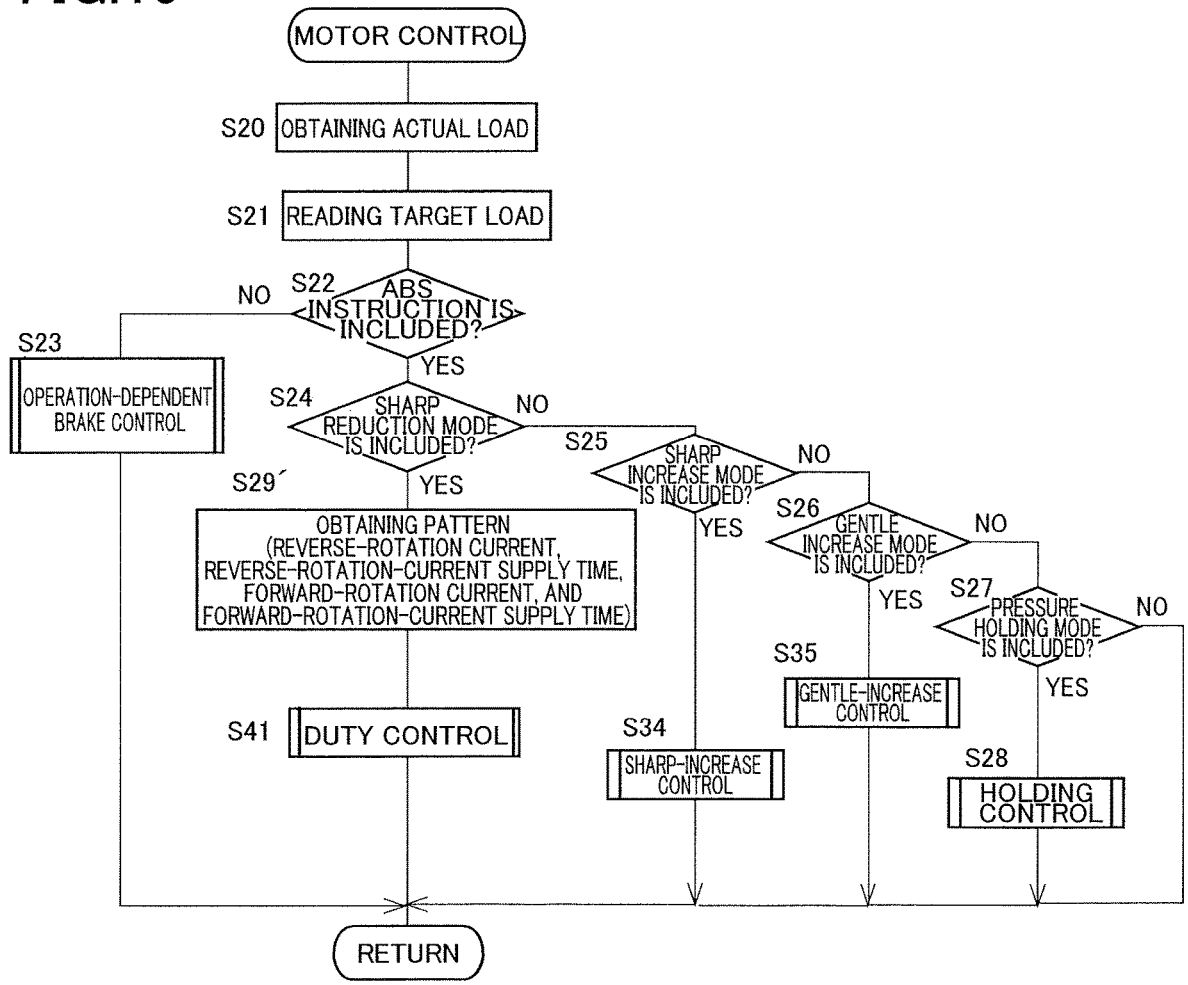

ELECTRIC-BRAKE CONTROLLER AND VEHICLE BRAKE SYSTEM

CROSS REFERENCE TO RELATED APPLICATION

The present application claims priority from Japanese Patent Application No. 2017-222916, which was filed on Nov. 20, 2017, the disclosure of which is herein incorporated by reference in its entirety.

BACKGROUND

The following disclosure relates to an electric-brake controller configured to control an electric brake activated by an electric motor and to a vehicle brake system including the electric-brake controller.

Patent Document 1 (Japanese Patent Application Publication No. 2005-247306) discloses an electric-brake controller configured to control an electric brake. In the electric brake disclosed in Patent Document 1, rotation of the electric motor in a forward direction advances the pressing member, and a pair of friction pads are pressed against a rotor, resulting in reduced rotation of a wheel. The electric brake is provided with a return spring configured to apply a spring force to the pressing member so as to move the pressing member backward.

In the case where anti-lock control is executed by an electric-brake controller disclosed in Patent Document 1, a sharp reduction mode is set in the case where deviation obtained by subtracting an actual slip rate from a target slip rate is less than −e1, a gentle reduction mode is set in the case where the deviation has become greater than −e2(−e1 <−e2), and a sharp increase mode is set in the case where the deviation has become greater than −e3(−e3 >−e2). In the case where each of the sharp reduction mode and the gentle reduction mode is set, current for rotating the electric motor reversely is supplied to the electric motor. In the case where the sharp increase mode is set, current for rotating the electric motor forwardly is supplied to the electric motor.

SUMMARY

Accordingly, an aspect of the disclosure relates to a technique of reducing an undershoot in anti-lock control.

In an electric-brake controller according to one aspect of the disclosure, when reducing a pressing force in anti-lock control, reverse-rotation current for rotating an electric motor in a reverse direction is supplied to the electric motor for a predetermined reverse-rotation-current supply time, and thereafter forward-rotation current for rotating the electric motor in a forward direction is supplied to the electric motor.

The supply of the reverse-rotation current to the electric motor can reduce the pressing force at a high rate, enabling quick recovery of a slipping state. In the case where feedback control is executed for the reverse-rotation current to be supplied to the electric motor, however, an undershoot occurs in the pressing force, which may lead to a shortage of braking force. In contrast, the present electric-brake controller supplies the forward-rotation current to the electric motor after supplying the reverse-rotation current to the electric motor for the predetermined reverse-rotation-current supply time. Thus, since the reverse-rotation current is supplied for the predetermined time, too long reverse-rotation-current supply time can be avoided. Since the forward-rotation current is supplied after the reverse-rotation current is supplied, the rotation of the electric motor in the reverse direction can be stopped quickly. Accordingly, it is possible to well reduce the undershoot of the pressing force in the anti-lock control.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 14 is a map indicating a relationship, stored in a storage of a motor ECU of an electric-brake controller according to a second embodiment, among a reverse-rotation current, a reverse-rotation-current supply time, an actual load, and deviation;

FIG. 15 is a flowchart representing a motor control program stored in the storage of the motor ECU;

DETAILED DESCRIPTION OF THE EMBODIMENTS

Hereinafter, there will be described embodiments of a vehicle brake system including an electric-brake controller.

First Embodiment

Figure 1:
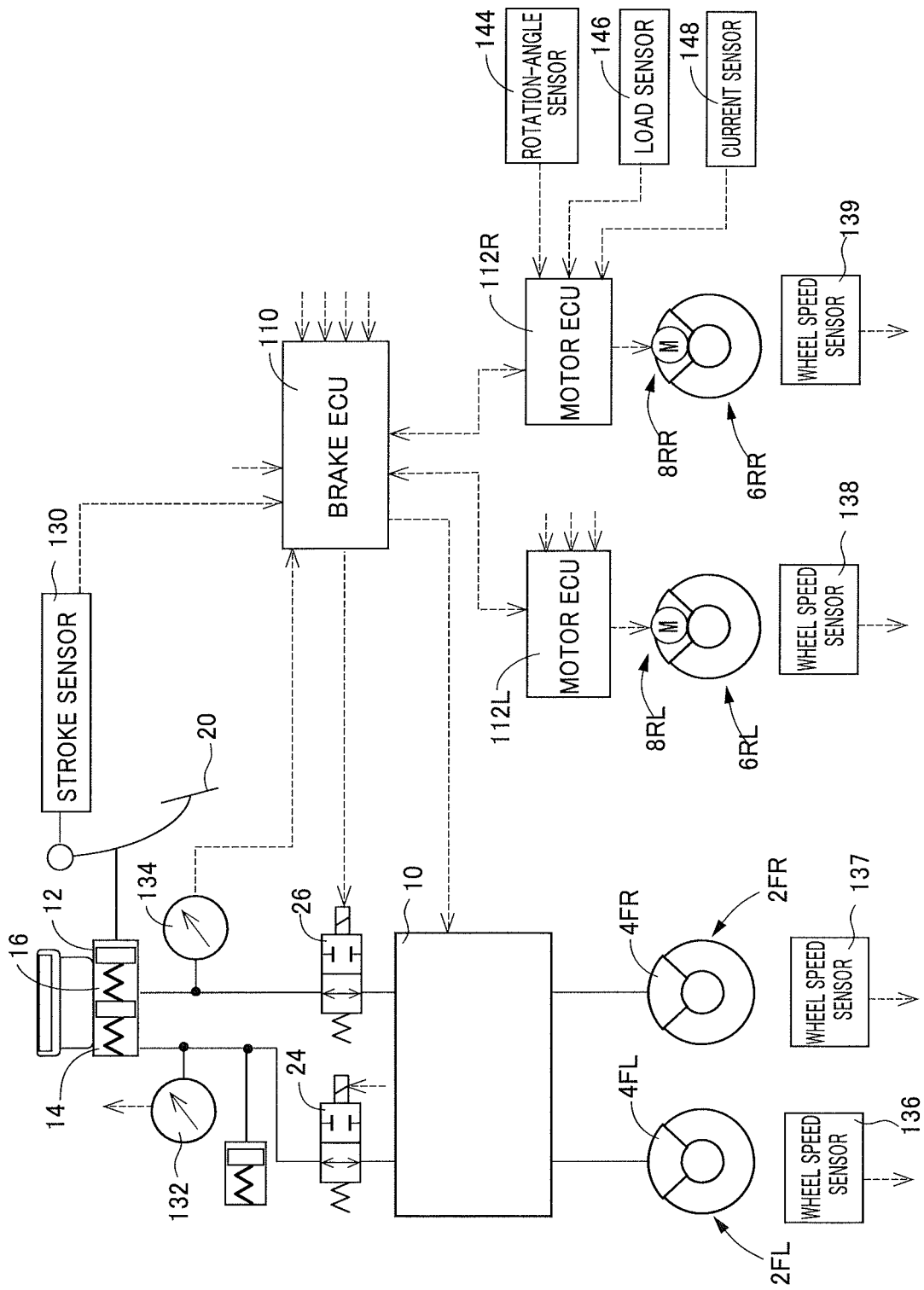
FIG. 1 is a view conceptually illustrating a vehicle brake system including an electric-brake controller according to a first embodiment.

As schematically illustrated in FIG. 1, a vehicle brake system includes: hydraulic brakes 4FL, 4FR provided respectively for front left and right wheels 2FL, 2FR; and electric brakes 8RL, 8RR provided respectively for rear left and right wheels 6RL, 6RR. The hydraulic brakes 4FL, 4FR are operated by hydraulic pressures in wheel cylinders of the respective hydraulic brakes 4FL, 4FR. The electric brakes 8RL, 8RR are operated by driving forces produced respectively by electric motors.

Hydraulic-pressure chambers 14, 16 of a master cylinder 12 are connected to the wheel cylinders of the respective hydraulic brakes 4FL, 4FR via a hydraulic-pressure control unit 10. Hydraulic pressures are produced in the respective hydraulic-pressure chambers 14, 16 of the master cylinder 12 in response to depression of a brake pedal 20 as a brake operating member. Normally-open electromagnetic open/close valves, namely, master cut-off valves 24, 26 are provided between the master cylinder 12 and the hydraulic-pressure control unit 10. In the case where an electrical system of the vehicle brake system is normal, the hydraulic-pressure control unit 10 is controlled in a state in which the master cut-off valves 24, 26 are closed. The hydraulic pressures controlled by the hydraulic-pressure control unit 10 are supplied to the wheel cylinders of the respective hydraulic brakes 4FL, 4FR. The supplied hydraulic pressures actuate the respective hydraulic brakes 4FL, 4FR, so that hydraulic braking forces, which are braking forces related to the hydraulic pressures in the respective wheel cylinders, are applied to the respective front left and right wheels 2FL, 2FR. In the following description, in the case where distinction of the wheels is not required, or components for the respective wheels are collectively referred, for example, suffixes (e.g., FL, FR, RL, RR, R, L) indicative of the corresponding wheels may be omitted.

Figure 2:
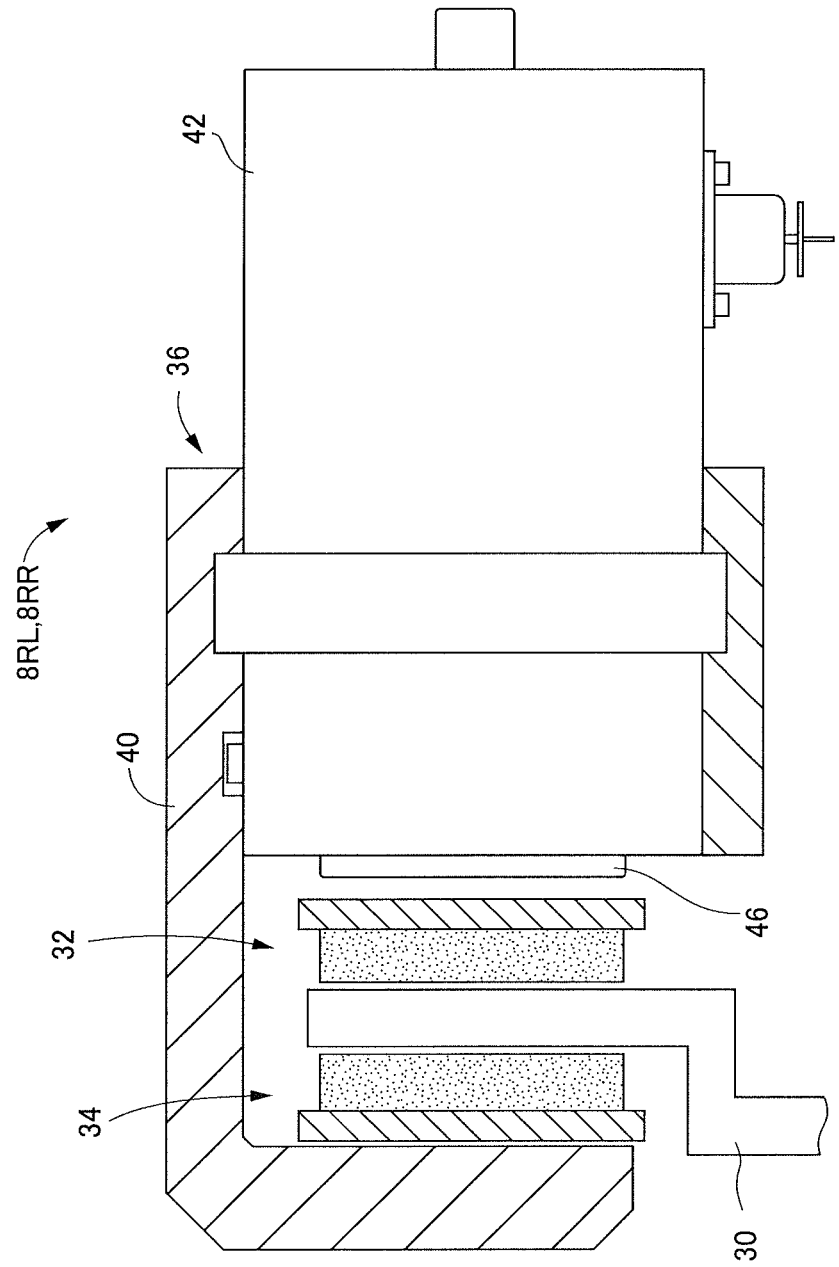
FIG. 2 is a cross-sectional view of an electric brake of the vehicle brake system.

As illustrated in FIG. 2, each of the electric brakes 8 is a disc brake including: a rotor 30 rotatable together with a corresponding one of the rear wheels 6; friction pads 32, 34, as a pair of friction members, held on a mounting bracket, not illustrated, and located on opposite sides of the rotor 30; and a pressing device 36. The pressing device 36 includes: a caliper 40 extending over the rotor 30 and held on the mounting bracket so as to be movable in a direction parallel with the rotation axis of the rotor 30; and an electric actuator 42 held on the caliper 40.

Figure 3:
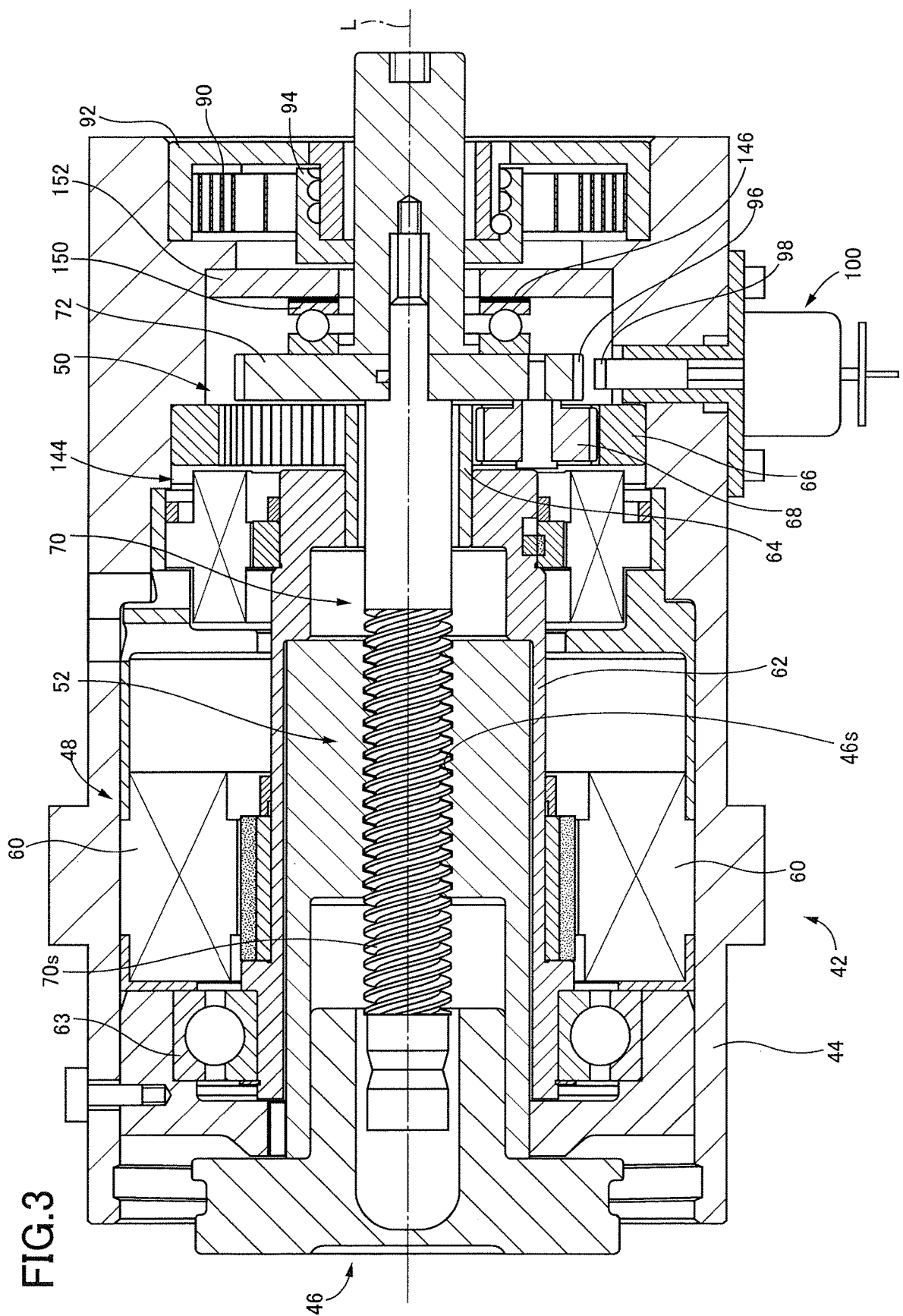
FIG. 3 is a cross-sectional view of a main portion of the electric brake.

As illustrated in FIG. 3, the electric actuator 42 includes: a housing 44; a pressing member 46 held on the housing 44 so as to be movable in the axial direction of the electric actuator 42 and not to be rotatable; a drive source including an electric motor 48 and a speed reducer 50; and a motion transmission mechanism 52 configured to transmit an output of the drive source to the pressing member 46. It is noted that the sign L indicates the axis of the electric actuator 42 which is parallel with the rotation axis of the rotor 30.

The pressing member 46 extends in the axial direction, with its front end portion opposed to the friction pad 32. An engaging hole extending in the axial direction is formed at a central portion of a rear portion of the pressing member 46. A female thread portion 46s is formed in an inner circumferential surface of the engaging hole.

The electric motor 48 includes: a plurality of coils 60 constituting a stator; and a rotation drive shaft 62 having a substantially hollow cylindrical shape. The rotation drive shaft 62 is held on the housing 44, with a bearing 63 interposed therebetween. The rotation drive shaft 62 is rotatable about the axis L and not movable in the axial direction. The rear portion of the pressing member 46 is fitted on an inner circumferential side of the rotation drive shaft 62 so as to be movable in the axial direction and rotatable relative to the rotation drive shaft 62.

In the case where current is supplied to the coils 60, the rotation drive shaft 62 is rotated without rotation of the pressing member 46. In the present embodiment, rotation of the rotation drive shaft 62 in its forward direction may be hereinafter referred to as "forward rotation" of the rotation drive shaft 62, and rotation of the rotation drive shaft 62 in its reverse direction may be hereinafter referred to as "reverse rotation" of the rotation drive shaft 62. Also, current to be supplied to the coils 60 so as to cause the forward rotation of the rotation drive shaft 62 may be hereinafter referred to as "forward-rotation current", and current to be supplied to the coils 60 so as to cause the reverse rotation of the rotation drive shaft 62 may be hereinafter referred to as "reverse-rotation current". For example, in the case where a DC motor is a DC brushless motor, the rotational direction of the rotation drive shaft 62 can be changed by changing the order of currents to be supplied to the coils 60.

In the case where the forward-rotation current is supplied to the coils 60, a forward-rotation driving force is output to the rotation drive shaft 62 to cause rotation of an output shaft 70 of the speed reducer 50 in an advance rotational direction to advance the pressing member 46 in an advance direction. In the case where the reverse-rotation current is supplied, a reverse-rotation driving force is output to the rotation drive shaft 62 to cause rotation of the output shaft 70 in a back rotational direction to move the pressing member 46 in a back direction. The rotation drive shaft 62 is connected to the speed reducer 50.

The speed reducer 50 is a planetary gear train including: a sun gear 64 rotatable together with the rotation drive shaft 62; a ring gear 66 secured to the housing 44; and a plurality of planetary gears 68 meshed with the sun gear 64 and the ring gear 66 to revolve around the sun gear 64. FIG. 3 illustrates one of the planetary gears 68. Each of the planetary gears 68 is coupled to the output shaft 70 of the speed reducer 50. Specifically, a flange 72 is integrally and rotatably provided on the output shaft 70, and the planetary gears 68 are mounted on the flange 72 so as to be rotatable on their respective axes. The output shaft 70 is rotated about the axis L with revolving of the planetary gears 68. The rotational speed of the rotation drive shaft 62 is reduced and output to the output shaft 70 by the speed reducer 50, and the rotational driving force of the rotation drive shaft 62 is boosted and output. It is noted that the output shaft 70 of the speed reducer 50 (a portion of the drive source) acts as an input shaft of the motion transmission mechanism 52. Thus, the output shaft 70 will be referred to as "input shaft 70".

The input shaft 70 extending in the axial direction is held on the housing 44 so as to be rotatable and not movable in the axial direction. The flange 72 is formed on a rear portion of the input shaft 70. A male thread portion 70s is formed in an outer circumferential portion of a front portion of the input shaft 70. The front portion of the input shaft 70 is inserted in the engaging hole of the rear portion of the pressing member 46, and the male thread portion 70s and the female thread portion 46s are engaged with each other. In the present embodiment, the motion transmission mechanism 52 as a screw mechanism is constituted by the male thread portion 70s of the input shaft 70 and the female thread portion 46s of the pressing member 46, for example. The motion transmission mechanism 52 also functions as a motion converter. It is noted that the female thread portion 46s and the male thread portion 70s are trapezoid screw portions.

Rotation of the input shaft 70 is converted to linear motion that is transmitted to the pressing member 46 to move the pressing member 46 in the axial direction. The forward rotation of the electric motor 48 rotates the input shaft 70 in the advance rotational direction to advance the pressing member 46. The friction pads 32, 34 are pressed against the rotor 30 by the pressing member 46 and the caliper 40, resulting in reduced rotation of the wheels 6. That is, the electric brakes 8 are activated to apply an electric braking force to the wheels 6, and the electric braking force is a braking force related to a pressing force applied to the rotor 30. The reverse rotation of the electric motor 48 rotates the input shaft 70 in the back rotational direction to move the pressing member 46 backward.

Figure 4A:
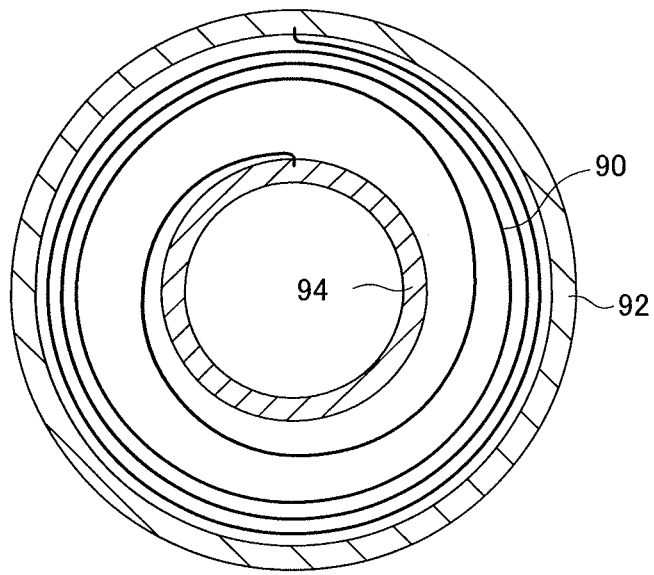
FIG. 4A is a front elevational view of a return spring of the electric brake in a normal state.
Figure 4B:
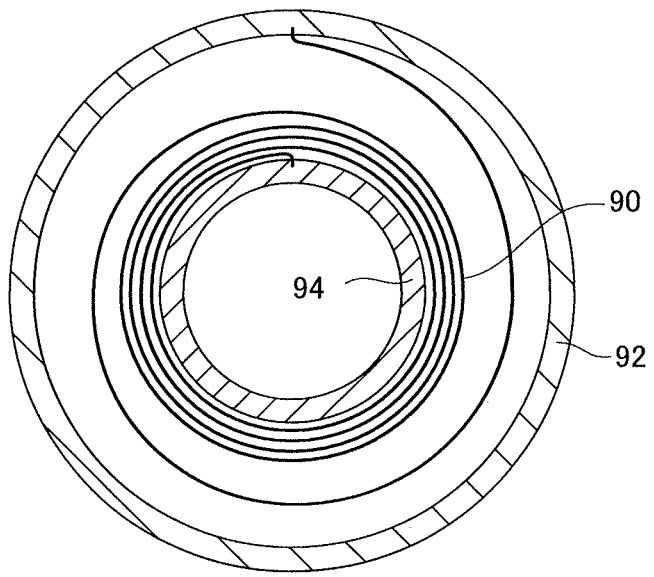
FIG. 4B is a front elevational view of the return spring in a tightened state.

A return spring 90 is provided between the rear portion of the input shaft 70 and the housing 44. The return spring 90 applies a spring force in the back rotational direction to the input shaft 70. The spring force in the back rotational direction is a spring force which rotates the input shaft 70 in the back rotational direction to move the pressing member 46 backward. The return spring 90 is a spiral spring, for example. As illustrated in FIGS. 4A and 4B, an outer-circumferential end portion of the return spring 90 is fastened to an outer-circumferential-side retainer 92 provided on the housing 44 so as not to be rotatable relative to the housing 44. An inner-circumferential end portion of the return spring 90 is fastened to an inner circumferential-side retainer 94 provided on the input shaft 70 so as not to be rotatable relative to the input shaft 70. In the case where the pressing member 46 is located at its back end position, as illustrated in FIG. 4A, the return spring 90 is in a normal state in which no force acts on the return sprint 90. As illustrated in FIG. 4B, the return spring 90 is wound and tightened with rotation of the input shaft 70 in the advance rotational direction, i.e., with advance of the pressing member 46. The spring force in the back rotational direction increases with advance of the pressing member 46.

The motion transmission mechanism 52 includes the trapezoid screw portion as described above. Thus, backward efficiency (i.e., efficiency at which the input shaft 70 is rotated by backward movement of the pressing member 46) is less than forward efficiency (i.e., efficiency at which the pressing member 46 is advanced or moved backward by rotation of the input shaft 70). This makes it difficult to rotate the input shaft 70 in the back rotational direction even when a force causing backward movement of the pressing member 46 is applied to the pressing member 46, which may cause brake drag. In the present embodiment, in contrast, the return spring 90 is provided to apply the spring force in the back rotational direction to the input shaft 70. Accordingly, in the case where the electric brakes 8 are canceled, the input shaft 70 is rotated in the back rotational direction, making it possible to well move the pressing member 46 back to the back end position.

It is noted that each of the electric brakes 8 also functions as an electric parking brake. The electric parking brake includes: ratchet teeth 96 formed in an outer circumferential portion of the flange 72; a ratchet pawl 98; and a solenoid 100 secured to the housing 44 and configured to move the ratchet pawl 98 between an operated position and a retracted position. The ratchet pawl 98 is moved to the operated position under excitation by the solenoid 100 so as to be engageable with one of the ratchet teeth 96. Engagement of the ratchet pawl 98 with one of the ratchet teeth 96 stops or prevents the input shaft 70 from rotating in the back rotational direction, the electric motor 48 from rotating in the reverse direction, and the pressing member 46 from moving backward. The engaged state is kept even when the solenoid 100 is demagnetized in this state.

As illustrated in FIG. 1, the present vehicle brake system includes: a brake ECU 110 configured to control the overall vehicle brake system; and motor ECUs 112L, 112R configured to control the respective electric motors 48L, 48R. Each of the brake ECU 110 and the motor ECUs 112L, 112R is principally constituted by a computer and includes devices, not illustrated, such as an executer, a storage, and an input/output device. The brake ECU 110 and the motor ECUs 112L, 112R are communicable with each other.

Devices connected to the input/output device of the brake ECU 110 include: a stroke sensor 130 configured to detect a stroke of the brake pedal 20; master-cylinder-pressure sensors 132, 134 configured to detect the hydraulic pressures in the respective hydraulic-pressure chambers 14, 16 of the master cylinder 12; wheel speed sensors 136-139 provided respectively for the front left and right and rear left and right wheels 2FL, 2FR, 6RL, 6RR to detect the rotational speeds of the respective wheels; the hydraulic-pressure control unit 10; and the master cut-off valves 24, 26.

Devices connected to the input/output device of each of the motor ECUs 112L, 112R include: a rotational angle sensor (a resolver) 144 configured to detect the rotation angle of a corresponding one of the electric motor 48; a load sensor 146 configured to detect load that is a force in the axial direction to be applied to the pressing member 46; a current sensor 148 configured to detect current flowing through the coils 60 of the electric motor 48; and a drive circuit of the electric motor 48.

In the present embodiment, a slip rate as one example of a slipping state of each of the wheels 2FL, 2FR, 6RL, 6RR is obtained based on values output from the respective wheel speed sensors 136-139. A position and a moving amount of the pressing member 46 in the axial direction are obtained based on a detection value of the rotation-angle sensor 144, i.e., the rotation angle of the electric motor 48. In the present embodiment, the load sensor 146 detects a reaction force against a pressing force by which the pressing member 46 presses the rotor 30 via the friction pads 32, 34. In the load sensor 146, a thrust bearing 150 provided between the input shaft 70 and a support plate 152 of the housing 44 detects a force in the axial direction which is to be applied to the support plate 152. Thus, the load detected by the load sensor 146 corresponds to the pressing force.

There will be next described operations of the vehicle brake system configured as described above. In the case where the brake pedal 20 is depressed, the brake ECU 110 obtains an operation state of the brake pedal 20 (hereinafter may be referred to as "brake-operation state") based on at least one of the detection value of the stroke sensor 130 and the detection values of the master-cylinder-pressure sensors 132, 134 and determines a total requested pressing force required by a driver, based on the brake-operation state. Based on the total requested pressing force, the brake ECU 110 determines (a) target load that is a target pressing force for each of the electric brakes 8L, 8R and (b) a target hydraulic pressure that is a target pressing force for each of the hydraulic brakes 4FL, 4FR.

In the case where a vehicle includes an electric motor serving as a drive source and applies a regenerative braking force to a drive wheel, for example, in the case where the vehicle is an electric vehicle, a target load Ft and a target hydraulic pressure are determined such that the regenerative braking force, the electric braking force, and the hydraulic braking force satisfy a total requested braking force corresponding to the total requested pressing force. In contrast, in the case where no regenerative braking force is applied to the drive wheel (e.g., the case where the vehicle does not include an electric motor serving as a drive source and the case where the vehicle includes an electric motor serving as a drive source, but no regenerative braking force is applied to the drive wheel), the target load Ft and the target hydraulic pressure are determined such that the electric braking force and the hydraulic braking force satisfy the total requested braking force.

The brake ECU 110 closes the master cut-off valves 24, 26, controls the hydraulic-pressure control unit 10, and outputs the target load Ft to the motor ECUs 112L, 112R. The hydraulic-pressure control unit 10 executes control for each of the hydraulic brakes 4FL, 4FR such that the actual hydraulic pressure in the wheel cylinder is brought closer to the target hydraulic pressure. Each of the motor ECUs 112L, 112R controls a corresponding one of the electric brakes 8RL, 8RR such that an actual load detected by the load sensor 146 is brought closer to the target load Ft.

Anti-lock control is initiated in the case where an initiating condition for the anti-lock control is satisfied during braking. One example of the initiating condition is that slip of the wheel has become excessive. It is noted that the anti-lock control is executed for each wheel in most cases, but even in the case where the vehicle is an electric vehicle, for example, when executing the anti-lock control, the regenerative braking force is usually set to zero. Thus, there is no need to take the regenerative braking force into consideration in the anti-lock control in many cases. It is noted that control for the hydraulic-pressure control unit 10 in the anti-lock control has not much relation to the present invention, and an explanation thereof is dispensed with. There will be next described control for the electric brakes 8RL, 8RR.

In the anti-lock control, the brake ECU 110 obtains the target load Ft based on at least one of an actual slip rate, load at initiation of the anti-lock control, and so on and determines a control mode from among a pressure holding mode, a sharp reduction mode, a sharp increase mode, a gentle increase mode, and the like. It is possible to consider that the control mode is information for instructing a rate of change in the load.

In the anti-lock control, load is principally controlled such that a slip rate for each wheel falls within an ideal slipping range. The ideal slipping range is a range of the slip rate in which a maximum braking force is obtained. It is known that the maximum braking force is achieved substantially by load at the time just before the initiating condition for the anti-lock control is satisfied. After initiation of the anti-lock control, it is difficult to well recover the slip rate even if the load is reduced to a value at the time just before the initiating condition for the anti-lock control is satisfied. Also, whether the slip rate has been recovered is obtained based on the actual slip rate, for example. The target load Ft during the anti-lock control is determined in view of the circumstances described above, and the target load Ft and the control mode are determined so as to reduce the slip and obtain an optimum braking force.

Control executed such that the target load Ft is determined based on the total requested pressing force determined based on the brake-operation state of the driver, and the actual load F is brought closer to the target load Ft may be referred to as "operation-dependent brake control", "non-anti-lock-state brake control", and "normal-state brake control" in contrast to slip reduction control (the anti-lock control). It is noted that the normal state is a state in which the slip reduction control, automatic brake, or the like is not executed. In the following description, the operation-dependent brake control may be any of (i) both of control executed by the brake ECU 110 and control executed by the motor ECUs 112 and (ii) each of control executed by the brake ECU 110 and control executed by the motor ECUs 112. Likewise, the anti-lock control may be at least one of control executed by the brake ECU 110 and control executed by the motor ECUs 112.

Figure 5:
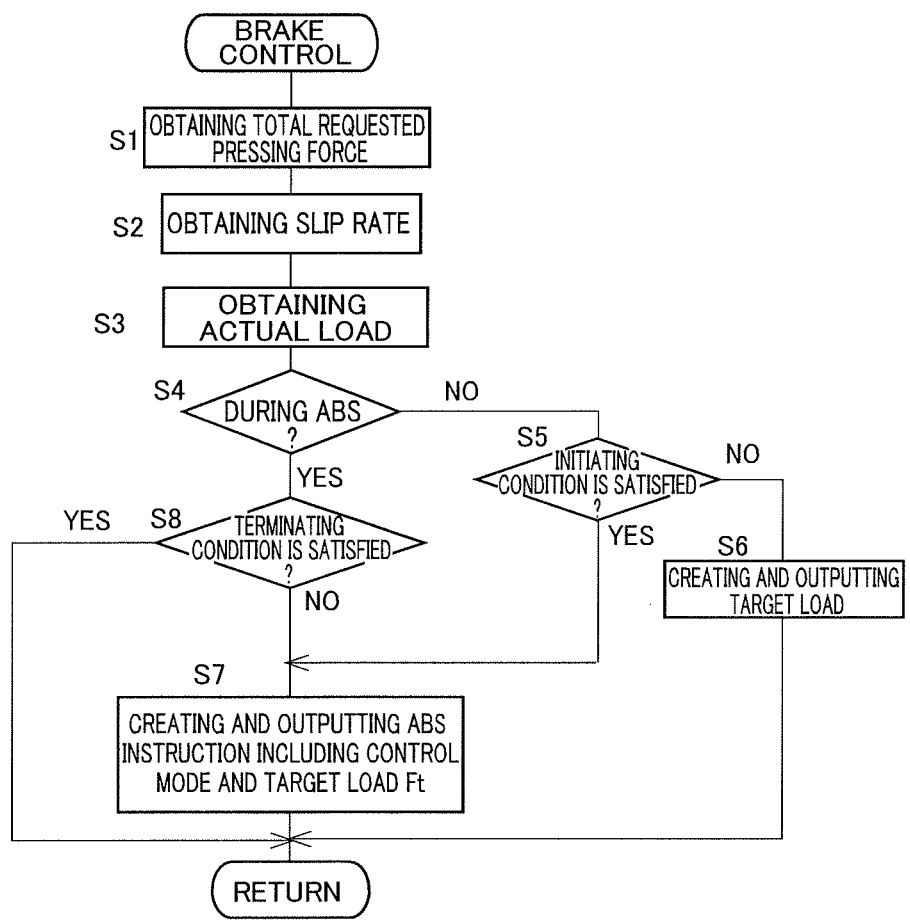
FIG. 5 is a flowchart representing a brake control program stored in a storage of a brake ECU of the vehicle brake system.

FIG. 5 is a flowchart representing a brake control program. The brake ECU 110 executes the brake control program each time when a set time Ts has elapsed. The flow of this program begins with S1 at which the stroke sensor 130 detects a stroke of the brake pedal 20, and the master-cylinder-pressure sensors 132, 134 detect the hydraulic pressures in the respective hydraulic-pressure chambers 14, 16. The brake-operation state is obtained based on at least one of these detection values, and the total requested pressing force is obtained. At S2, the rotational speed of each of the wheels 2FR, 2FL, 6RR, 6RL is detected by a corresponding one of the wheel speed sensors 136-139, and the speed of a vehicle body is estimated to obtain the slip rate for each wheel. At S3, the actual load detected by the load sensor 146 is obtained. At S4, it is determined whether the anti-lock control is being executed. When the anti-lock control is not being executed, it is determined at S5 whether the initiating condition for the anti-lock control is satisfied. For example, it is determined that the initiating condition is satisfied when the slip rate is greater than or equal to an initiation threshold value. When the initiating condition for the anti-lock control is not satisfied, the target load Ft is obtained based on the total requested pressing force, and a control instruction including the target load Ft, which is information or a signal, is created and output to the motor ECUs 112 at S6.

When the initiating condition for the anti-lock control is satisfied, a positive decision (YES) is made at S5, and the target load Ft and the control mode are determined at S7 based on the actual slip rate, the load at initiation of the anti-lock control, and so on. A control instruction including the anti-lock control instruction, the target load Ft, and the control mode is created and output to the motor ECUs 112.

In the case where the present program is executed at next time, the anti-lock control is being executed. Thus, a positive decision (YES) is made at S4, and it is determined at S8 whether a terminating condition for the anti-lock control is satisfied. For example, it is determined that the terminating condition is satisfied when the slip rate is less than or equal to a termination threshold value or when the vehicle is stopped. The processings S1-S4, S8, and S7 are repeated before the terminating condition is satisfied, but the anti-lock control is terminated when the terminating condition is satisfied. In some cases, the operation-dependent brake control is thereafter executed based on details of the terminating condition.

For example, the vehicle brake system may be configured such that, in the case where the initiating condition for the anti-lock control is satisfied, the pressure holding mode is set, and the sharp reduction mode is set thereafter. The sharp reduction mode is kept until the slip rate becomes less than or equal to a recovery threshold value. The vehicle brake system may be configured such that, in the case where the slip rate has become less than or equal to the recovery threshold value, the sharp increase mode is set, and the gentle increase mode is set thereafter.

When the brake control program is executed by the brake ECU 110, as described above, the control instruction including the target load Ft or the control instruction including the anti-lock control instruction, the target load Ft, and the control mode is created and output to the motor ECUs 112. This brake control program is executed each time when the set time Ts has elapsed (noted that the set time Ts is a cycle time at which the computer executes the program). Thus, the above-described control instruction is created each time when the set time Ts has elapsed, and output to the motor ECUs 112. The control instruction is not output in the middle of a lapse of the set time Ts.

Figure 6:
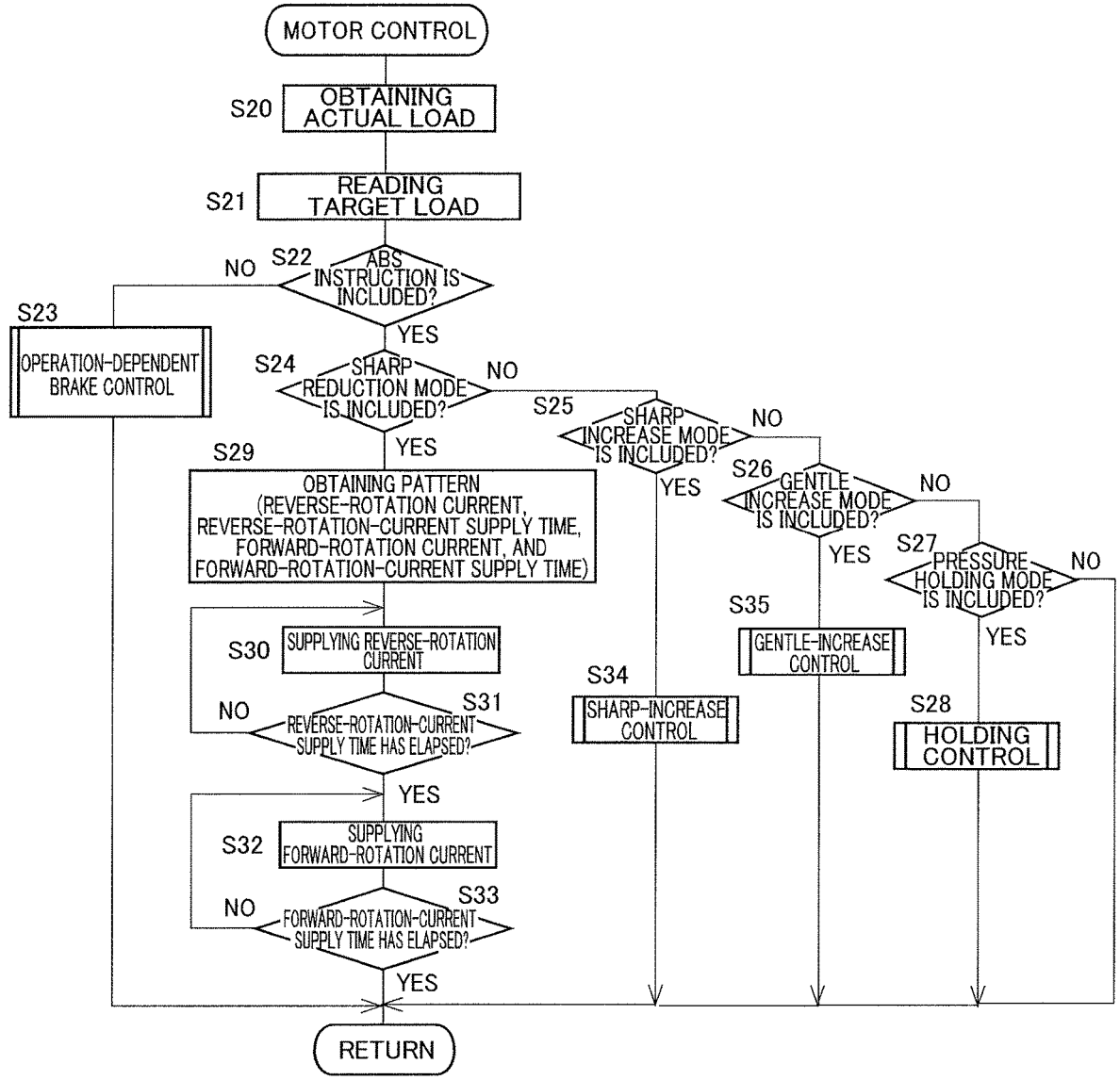
FIG. 6 is a flowchart representing a motor control program stored in a storage of a motor ECU of the vehicle brake system.
Figure 7:
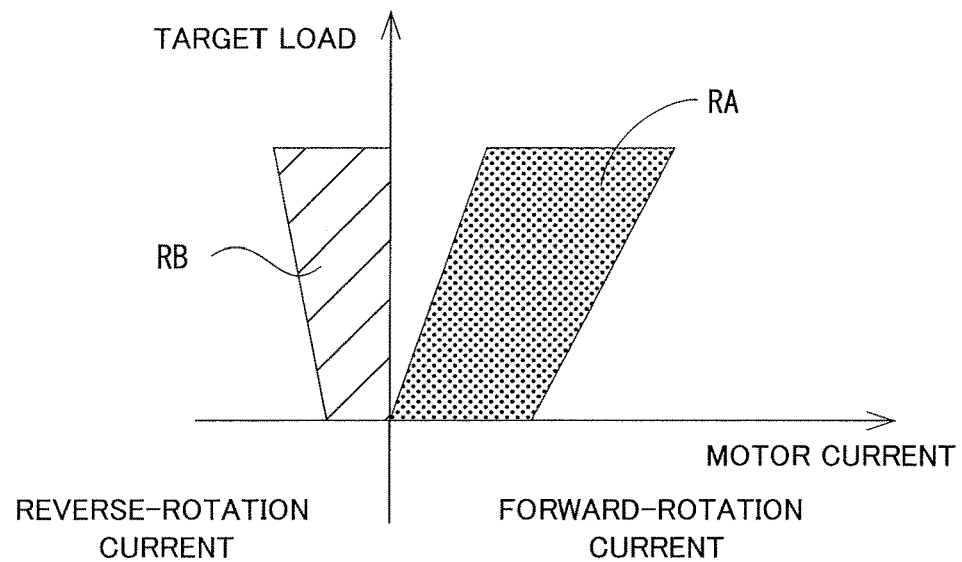
FIG. 7 is a view conceptually illustrating ranges of control of current to be supplied to an electric motor of the electric brake.

FIG. 6 is a flowchart representing a motor control program that is executed by each of the motor ECUs 112 each time when the control instruction is supplied from the brake ECU 110, in other words, each time when the set time Ts has elapsed. At S20, the actual load F that is a detection value of the load sensor 146 is read. At S21, the target load Ft included in the control instruction supplied from the brake ECU 110 is read. At S22, it is determined whether the control instruction supplied from the brake ECU 110 includes the anti-lock control instruction. When the anti-lock control instruction is not included, the operation-dependent brake control is executed at S23. Feedback control is executed in accordance with a difference between the target load Ft obtained at S21 and the actual load F obtained at S20. For example, PID control may be executed. In this case, current of a magnitude equal to a value obtained by multiplying the difference between the target load Ft and the actual load F by a gain. In the present embodiment, current in a region RA in FIG. 7 is supplied to the coils 60, in other words, the forward-rotation current is supplied to the coils 60 also in the case where the actual load F is reduced.

In each of the electric brakes 8, the forward-rotation driving force that rotates the rotation drive shaft 62 to cause rotation of the input shaft 70 in the advance rotational direction to advance the pressing member 46, i.e., a force in the advance direction which is applied from the electric motor 48 to the pressing member 46, is applied to the rotation drive shaft 62, and the spring force in the back rotational direction is applied to the input shaft 70 by the return spring 90 in a state in which the forward-rotation current is supplied to the coils 60. Load is determined based on the forward-rotation driving force, i.e., the force in the advance direction which is applied from the electric motor 48 to the pressing member 46, and the spring force in the back rotational direction. Thus, decrease in the forward-rotation current supplied to the coils 60 decreases the forward-rotation driving force produced by the electric motors 48, i.e., the force in the advance direction which is applied from the electric motor 48 to the pressing member 46, which decreases the load. In the present embodiment, the specifications of the return spring 90, the electric motor 48, the speed reducer 50, and so on are designed such that load is zero in the case where current supplied to the electric motor 48 is set to zero.

In the operation-dependent brake control, the rate of reduction in load is determined based on the speed of returning of the brake pedal 20, and the speed of returning is determined based on, e.g., a spring force of a return spring of the brake pedal 20 and the speed of a releasing operation of the driver. The rate of reduction in load in this case can be achieved in most cases by control of the forward-rotation current to be supplied to the electric motor 48. In view of the above, load is controlled in the operation-dependent brake control by controlling the forward-rotation current within the region RA in FIG. 7.

Figure 8:
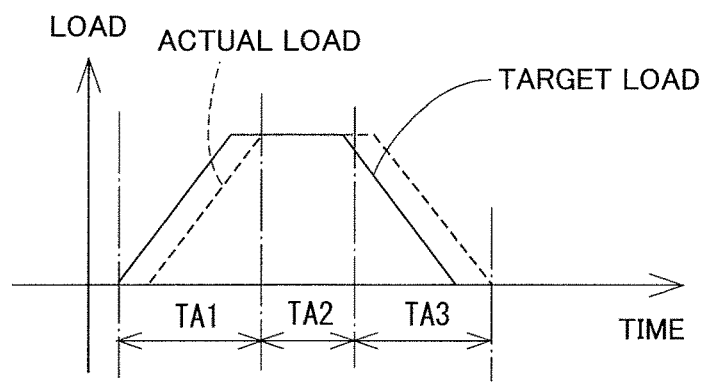
FIG. 8 is a view indicating changes in load on the electric brake.
Figure 9:
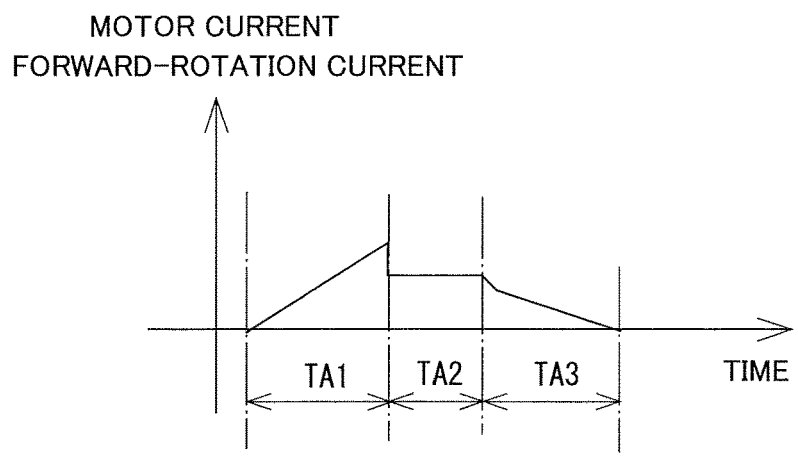
FIG. 9 is a view indicating changes in current supplied to the electric motor of the electric brake.

An increase mode in a period TA1 in FIGS. 8 and 9 is set since the actual load F is small with respect to the target load Ft. The forward-rotation current to be supplied to the electric motor 48 is increased, and the actual load F is increased.

Figures 10, 11:
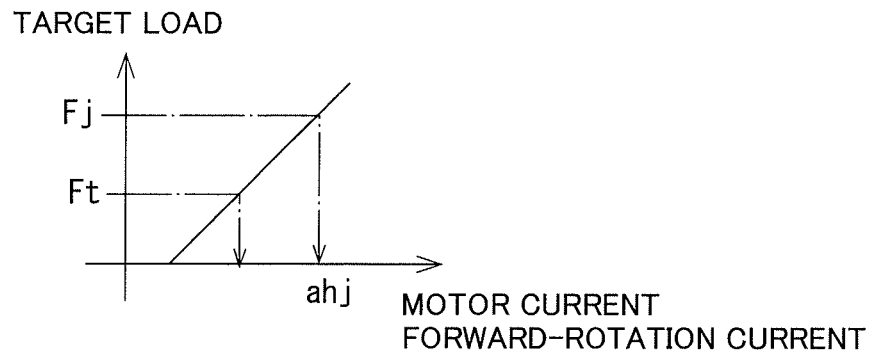
FIG. 10 is a view indicating a relationship, stored in the storage of the motor ECU, between a forward-rotation current and a target load.
FIG. 11 is a map indicating a relationship, stored in the storage of the motor ECU, among a reverse-rotation current, a reverse-rotation-current supply time, an actual load, and deviation.

The pressure holding mode is set in a period TA2 in FIGS. 8 and 9 since the difference between the target load Ft and the actual load F is small in this period. In the present embodiment, current related to the target load Ft is applied to the coils 60 to keep the actual load at the target load Ft. In the electric brake 8, the spring force of the return spring 90 in the back rotational direction which is to be applied to the input shaft 70 is larger in the case where an amount of movement of the pressing member 46 from its back end position (an amount of advance of the pressing member 46) is large than in the case where the amount of movement of the pressing member 46 from its back end position is small. Thus, in the case where the load is kept at the target load Ft, larger forward-rotation current (i.e., a larger forward-rotation driving force to be applied to the rotation drive shaft 62, e.g., a larger force in the advance direction which is applied from the electric motor 48 to the pressing member 46) is required in the case where the spring force of the return spring 90 in the back rotational direction is large than in the case where the spring force of the return spring 90 in the back rotational direction is small. In the present embodiment, as illustrated in FIG. 10, a relationship between the target load Ft, and the forward-rotation current to be supplied to the electric motor 48 in the case where the actual load F is kept at the target load Ft is obtained in advance and stored in the storage of the motor ECU 112. Thus, in the case where the pressure holding mode is set, a value of the forward-rotation current is determined based on the target load Ft and the relationship illustrated in FIG. 10 and supplied to the coils 60.

A reduction mode is set in a period TA3 illustrated in FIGS. 8 and 9 since the actual load F is large with respect to the target load Ft. The forward-rotation current to be supplied to the electric motor 48 is reduced, and the actual load F is reduced.

In the case where the control instruction supplied from the brake ECU 110 includes the anti-lock control instruction, it is determined at S24 whether the control instruction includes the sharp reduction mode. When a negative decision (NO) is made at S24, it is determined at S25 whether the control instruction includes the sharp increase mode. When a negative decision (NO) is made at S25, it is determined at S26 whether the control instruction includes the gentle increase mode. When a negative decision (NO) is made at S26, it is determined at S27 whether the control instruction includes the pressure holding mode. When the control instruction includes the pressure holding mode, a positive decision (YES) is made at S27, and the actual load F is kept at the target load Ft at S28. The forward-rotation current to be supplied to the coils 60 of the electric motor 48 is determined based on the target load Ft included in the control instruction and the relationship illustrated in FIG. 10, and the determined forward-rotation current is supplied.

In the case where the control instruction includes the sharp reduction mode, a positive decision (YES) is made at S24, load is sharply reduced at S29-S33. In the sharp reduction mode, the load is required to be quickly reduced to recover the slip rate quickly. Thus, in the present embodiment, current in a region RB in FIG. 7 (the reverse-rotation current) is supplied to the coils 60. In the case where the reverse-rotation current is supplied to the coils 60, the reverse-rotation driving force is output to the rotation drive shaft 62. Both of the reverse-rotational driving force output to the rotation drive shaft 62 and the spring force applied to the input shaft 70 from the return spring 90 cause backward movement of the pressing member 46. That is, the electric motor 48 assists the pressing member 46 with its backward movement. This makes it possible to reduce the load at a high rate. However, an undershoot may occur in the case where the rotation of the electric motor 48 in the reverse direction cannot be stopped immediately due to inertia.

To solve this problem, in the present embodiment, the set time Ts is divided into (i) a reverse-rotation-current supply time that is a length of time for which the reverse-rotation current is supplied and (ii) a forward-rotation-current supply time that is a length of time for which the forward-rotation current is supplied, and after the reverse-rotation current is supplied for the reverse-rotation-current supply time, the forward-rotation current is supplied for a remaining time that is a time remaining until the set time Ts passes and that is equal to the forward-rotation-current supply time. The magnitude of reverse-rotation current ad and a reverse-rotation-current supply time td are determined based on the target load Ft, the actual load F, and the map represented in FIG. 11. The reverse-rotation-current supply time td tends to be longer in the case where deviation that is a value obtained by subtracting the target load Ft from the actual load F is large than in the case where the deviation is small. The magnitude of the reverse-rotation current ad tends to be smaller in the case where the actual load F is large than in the case where the actual load F is small. In the case where the map is created discretely, the reverse-rotation current ad and the reverse-rotation-current supply time td for any target load Ft and any actual load F may also be obtained by interpolation. Forward-rotation current ah is obtained based on the target load Ft and the relationship illustrated in FIG. 10 as in the case described above. A forward-rotation-current supply time th is a time th obtained by subtracting the reverse-rotation-current supply time td from the set time Ts (=Ts−td).

It is noted that the forward-rotation-current supply time th is such a length of time that the rotation drive shaft 62 is not rotated in the forward direction by supply of the forward-rotation current to the coils 60. When the forward-rotation current is supplied to the coils 60 in a state in which the rotation drive shaft 62 is rotating in the reverse direction, the rotation of the rotation drive shaft 62 is stopped, and then the rotation drive shaft 62 is rotated in the forward direction. For this reason, in the present embodiment, the forward-rotation-current supply time th is set to such a length of time that the rotation drive shaft 62 is not rotated in the forward direction.

As represented by the flowchart in FIG. 6, a pattern in the sharp reduction mode is determined at S29. That is, the reverse-rotation-current supply time td, the reverse-rotation current ad, the forward-rotation-current supply time th, and the forward-rotation current ah are determined. For example, in the case where the actual load F is Fi, the target load Ft included in the control instruction is Fj, and deviation is x (=Fi−Fj) in the sharp reduction mode at time point t1 in FIGS. 12 and 13, a reverse-rotation-current supply time tdix and reverse-rotation current adix are determined according to the map in FIG. 11. Forward-rotation current ahj is determined based on the target load Fj and the relationship in FIG. 10, and a forward-rotation-current supply time thj (Ts−tdix) is determined as described above.

At S30, the reverse-rotation current adix is supplied. It is determined at S31 whether the reverse-rotation-current supply time tdix has elapsed from the time point when the processing at S30 is executed. The processings at S30 and S31 are repeated until the reverse-rotation-current supply time tdix passes. When the reverse-rotation-current supply time tdix has elapsed, the forward-rotation current ahj is supplied at S32. It is determined at S33 whether the forward-rotation-current supply time thj has elapsed from the time point when the processing at S32 is executed. The processings at S32 and S33 are repeated until the forward-rotation-current supply time thj passes. When the forward-rotation-current supply time thj has elapsed, a positive decision (YES) is made at S33, and one routine of the motor control program ends. The set time Ts has elapsed from the start of the motor control program, and the next control instruction is supplied.

In the case where the sharp reduction mode is set as described above, the forward-rotation current is supplied after supply of the reverse-rotation current in one cycle time. The reverse-rotation current is supplied for the predetermined reverse-rotation-current supply time tdix, and feed-forward control is executed.

In the case where the motor control program is executed at the next time, when the control instruction includes the sharp reduction mode, positive decisions (YES) are made at S22 and S24, the processings at S29-S33 are executed in the same manner as that described above, and the forward-rotation current is supplied after supply of the reverse-rotation current. The reverse-rotation current and the forward-rotation current are repeatedly supplied in a period in which the control instruction supplied from the brake ECU 110 includes the anti-lock control instruction and the sharp reduction mode. For example, the actual load F is Fj, the target load Ft included in the control instruction is Fk, and deviation is y (=Fj−Fk) at time point t2 in FIGS. 12 and 13. The deviation y is a value in the map in FIG. 11, but in the case where no corresponding value exists for the actual load Fj, the reverse-rotation current is determined by interpolation. For example, in the case where the actual load Fj is less than Fi and greater than Fp, a reverse-rotation current adjy is obtained according to the following expression: adjy=adpy+(adiy−adpy)×(Fj−Fp)/(Fi−Fp). A reverse-rotation-current supply time tdjy is in most cases equal to times tdiy, tdpy each of which is a time in the case where the deviation is y. For example, the times tdjy, tdiy, tdpy are equal to each other in most cases.

In the case where the control instruction supplied from the brake ECU 110 includes the anti-lock control instruction and the sharp increase mode, a positive decision (YES) is made at S25, and this flow goes to S34 at which the forward-rotation current to be supplied to the coils 60 is increased, and the actual load F is increased at a high rate. In the sharp increase mode, the feedback control is executed such that the actual load F is brought closer to the target load Ft. It is noted that, even if the actual load F is large with respect to the target load Ft in the sharp increase mode as long as the slip rate of each of the wheels 2, 6 is not excessive, no problem arises as long as the actual load F is less than total load that is load corresponding to the total requested pressing force. Thus, the gain in feedback can be made large when compared with the case in the operation-dependent brake control. A reduction-start threshold value can be made a larger value when compared with the case in the operation-dependent brake control. For example, in the case where the actual load F becomes greater than the sum of the target load Ft and the reduction-start threshold value, the reduction mode is set, but the actual load F may be large with respect to the target load Ft in the sharp increase mode of the anti-lock control. Thus, the reduction-start threshold value may be large to make it difficult for the reduction mode to be set.

When the control instruction supplied from the brake ECU 110 includes the anti-lock control instruction and the gentle increase mode, a positive decision (YES) is made at S26, and gentle-increase control is executed at S35. In the gentle-increase control, actual load F is gradually increased so as to be brought closer to the target load Ft determined based on the total requested pressing force, which gradually increases the actual load F. That is, the same control as executed in the operation-dependent brake control can be executed also in the case where the gentle increase mode is set. Thus, the gain in feedback and the like may be the same values as used in the case in the operation-dependent brake control.

Figure 12:
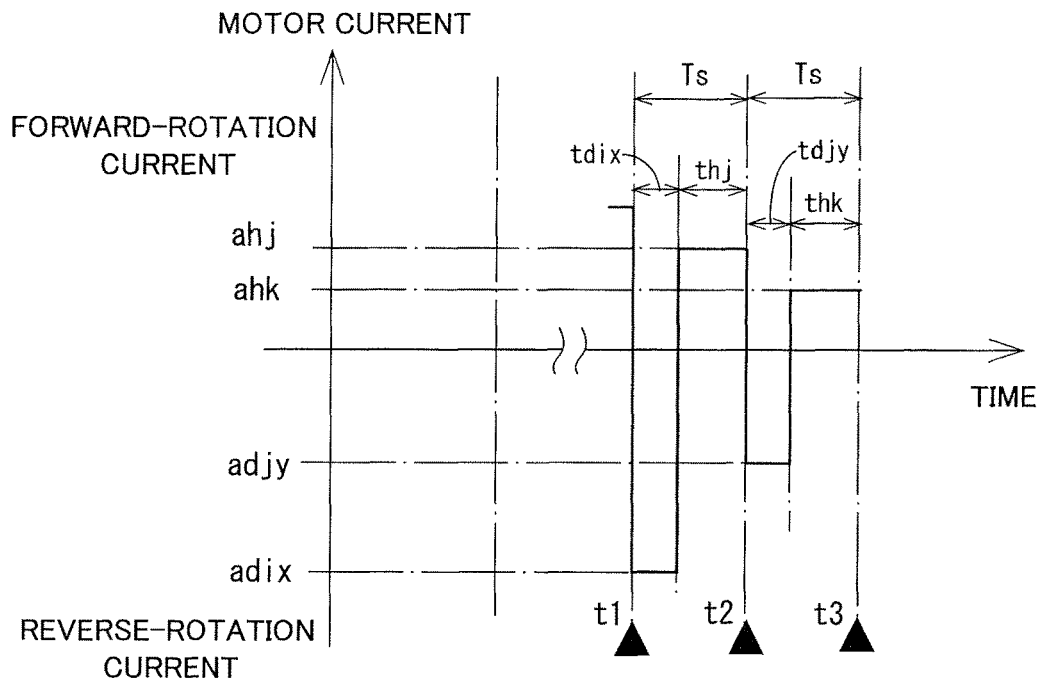
FIG. 12 is a view indicating changes in current supplied to the electric motor in the case where anti-lock control is executed for the electric brake.
Figure 13:
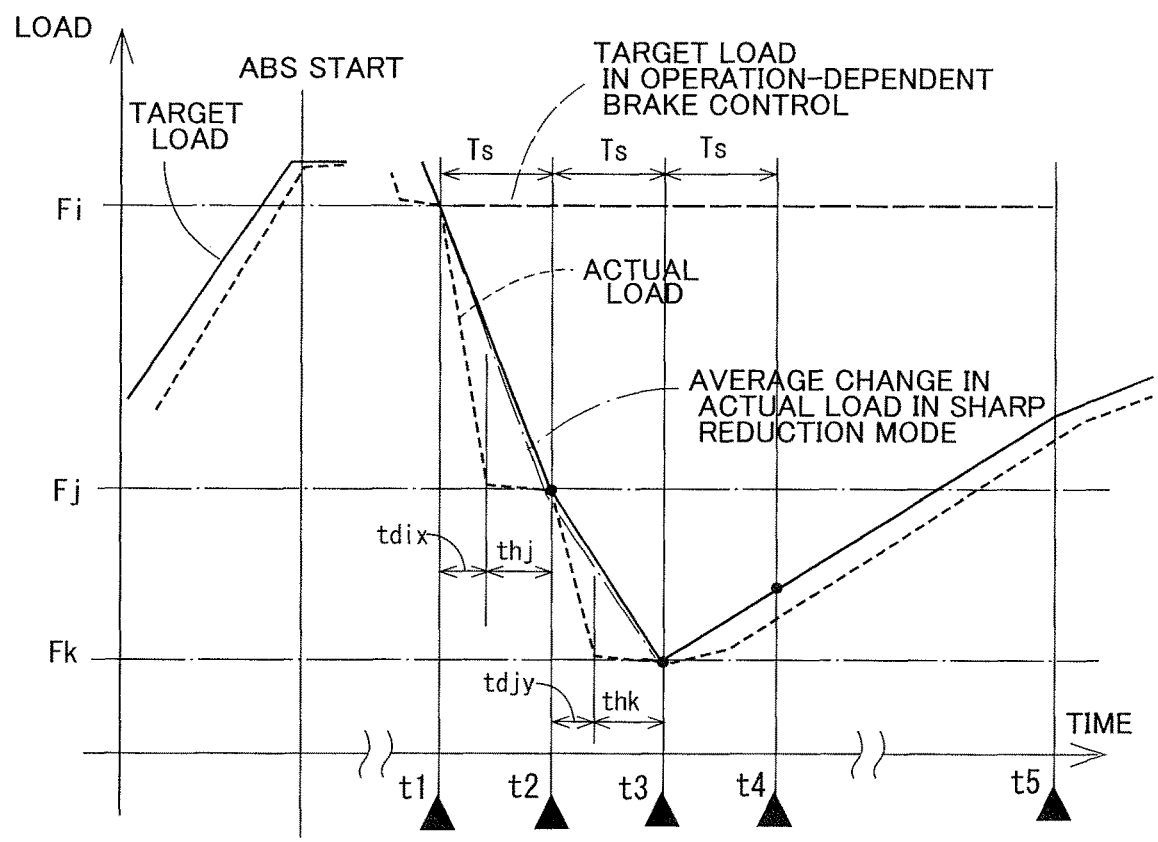
FIG. 13 is a view indicating changes in load in the case where the anti-lock control is executed for the electric brake.
Figure 16:
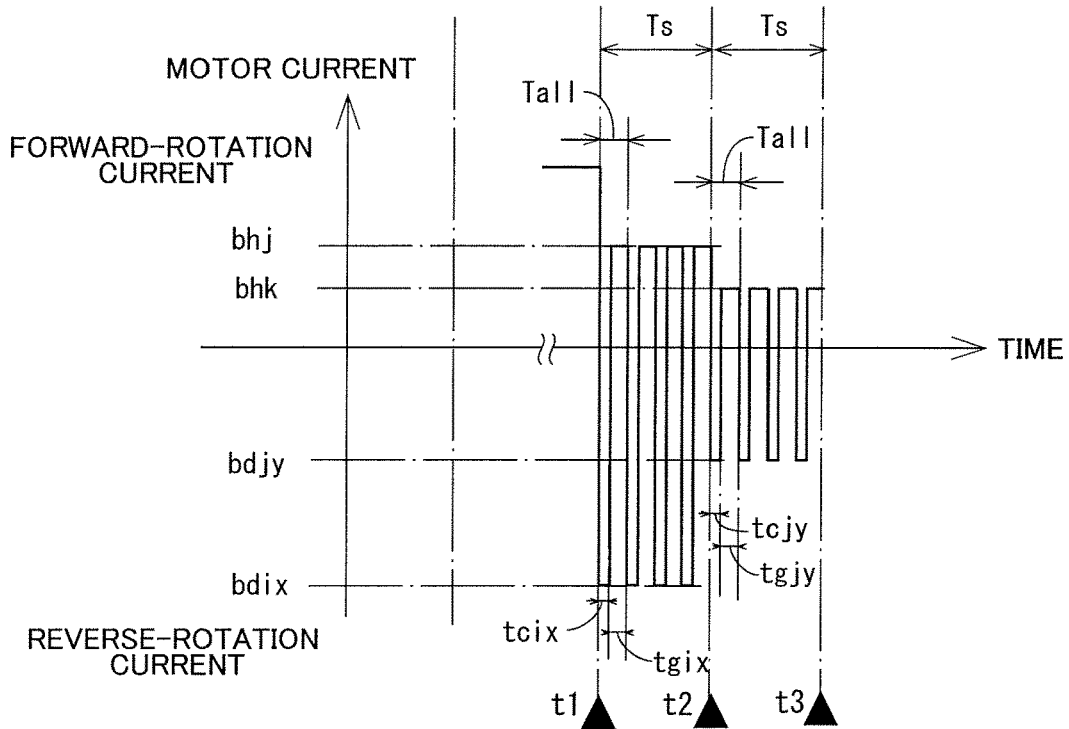
FIG. 16 is a view indicating changes in current supplied to the electric motor in the case where the anti-lock control is executed for the electric brake.

In the present embodiment as described above, in the case where the sharp reduction mode is set, as illustrated in FIG. 12, the forward-rotation current is supplied to the coils 60 after supply of the reverse-rotation current to the coils 60. Accordingly, as illustrated in FIG. 13, the actual load F is changed sharply and then kept. Thus, it is possible to quickly stop reverse rotation of the electric motor 48 in the sharp reduction mode, resulting in reduced undershoot.

While the sharp increase mode is set at time point t3 in FIGS. 12 and 13 instead of the sharp reduction mode, the actual load F can be increased quickly in the case where the sharp increase mode is set. In the electric-brake controller disclosed in Patent Document 1, the sharp reduction mode, the gentle reduction mode, and the sharp increase mode are set in this order, and the electric motor is rotated reversely in the case where each of the sharp reduction mode and the gentle reduction mode is set. Thus, even if the sharp increase mode is set, load does not increase immediately and increases with a time lag in some cases. In the present embodiment, in contrast, rotation of the electric motor 48 is substantially stopped at the end of the sharp reduction mode, in other words, at the time point when the sharp increase mode is set. This configuration makes it possible to increase the actual load F immediately in the sharp increase mode, thereby well reducing a shortage of the braking force.

The one-dot chain line in FIG. 13 indicates an average reduction rate of the actual load F in the case where the sharp reduction mode is set. The reduction rate of the actual load F indicated by the one-dot chain line is greater than the maximum reduction rate achieved by the operation-dependent brake control. Thus, when compared with a case where the actual load F is reduced by reduction in the forward-rotation current, the actual load F can be reduced at a high rate, making it possible to quickly recover the slip rate in the sharp reduction mode.

In each of the cycle times Ts, the reverse-rotation current and the forward-rotation current are supplied to the coils 60 in this order. This configuration can well reduce an undershoot at the time point when the one cycle time Ts has passed, making it possible to well bring the actual load F closer to the target load Ft. It is possible to improve the followability of the actual load F to the target load Ft in the anti-lock control, resulting in improved control accuracy.

It is noted that control of load in the case where each of the sharp increase mode, the gentle increase mode, and so on is set is not limited to that in the above-described embodiment. The details of the feedback control are not limited to those in the above-described embodiment. For example, to bring the actual load F closer to the target load Ft, the actual load F may be changed (increased or decreased) in a state in which the rotational speed of the electric motor 48 is kept constant, the actual load F may be changed in a state in which a rate of change in current to be supplied to the electric motor 48 is kept constant, and the actual load F may be changed at a predetermined set rate.

In the present embodiment, an antilock controller is constituted by the brake ECU 110, the motor ECUs 112L, 112R, the wheel speed sensors 136-139, and the load sensor 146, for example. A pressing-force reducer is constituted by portions of the antilock controller which store and execute the processings at S7 and S29-S33, for example. A reverse-rotation-current supplier is constituted by portions of the pressing-force reducer which store and execute the processings at S30 and S31, for example. A forward-rotation-current supplier is constituted by portions of the pressing-force reducer which store and execute the processings at S32 and S33, for example. A pattern determiner and a forward-rotation-current determiner are constituted by portions of the pressing-force reducer which store and execute the processing at S29, for example. A main controller and a target-pressing-force determiner are constituted by portions of the pressing-force reducer which store and execute the processing at S7, for example. An operation-dependent pressing-force controller is constituted by the load sensor 146 and portions of the brake ECU 110 and the motor ECUs 112L, 112R which store and execute the processings at S1-S3, S6, and S23, for example. A forward-rotation-current reducer is constituted by portions of the operation-dependent pressing-force controller which store and execute the processing at S23, for example.

It is noted that FIGS. 12 and 13 indicate the changes in current and load in two cycles in the sharp reduction mode, but this does not mean that the sharp reduction mode is finished when two cycles have elapsed.

Second Embodiment

In the present embodiment, duty control is executed for current to be supplied to the coils 60 in the sharp reduction mode in the anti-lock control. As illustrated in FIG. 14, reverse-rotation current bd and a duty ratio in the duty control, e.g., a ratio $\gamma$ of a reverse-rotation-current supply time tc to a reference time Tall are determined based on the actual load F and the target load Ft, for example. The reference time Tall is the sum of (i) the reverse-rotation-current supply time tc that is a length of time for which the reverse-rotation current is supplied once and (ii) a forward-rotation-current supply time tg that is a length of time for which the forward-rotation current is supplied once. For example, the ratio $\gamma$ tends to be larger in the case where deviation that is a value obtained by subtracting the target load Ft from the actual load F is large than in the case where the deviation is small. The reverse-rotation current bd tends to be smaller in the case where the actual load F is large than in the case where the actual load F is small. For example, in the case where reverse-rotation current bdix and a ratio $\gamma$ix are determined according to the map in FIG. 14 based on an actual load Fi and the target load Fj, a reverse-rotation-current supply time tcix and a forward-rotation-current supply time tgix are obtained based on the reference time Tall and the ratio $\gamma$ix according to the following expressions: tcix=Tall×$\gamma$ix; and tgix=Tall×(1−$\gamma$ix). A forward-rotation current bhj is determined based on the relationship illustrated in FIG. 10 and the target load Fj as in the above-described embodiment.

Figure 17:
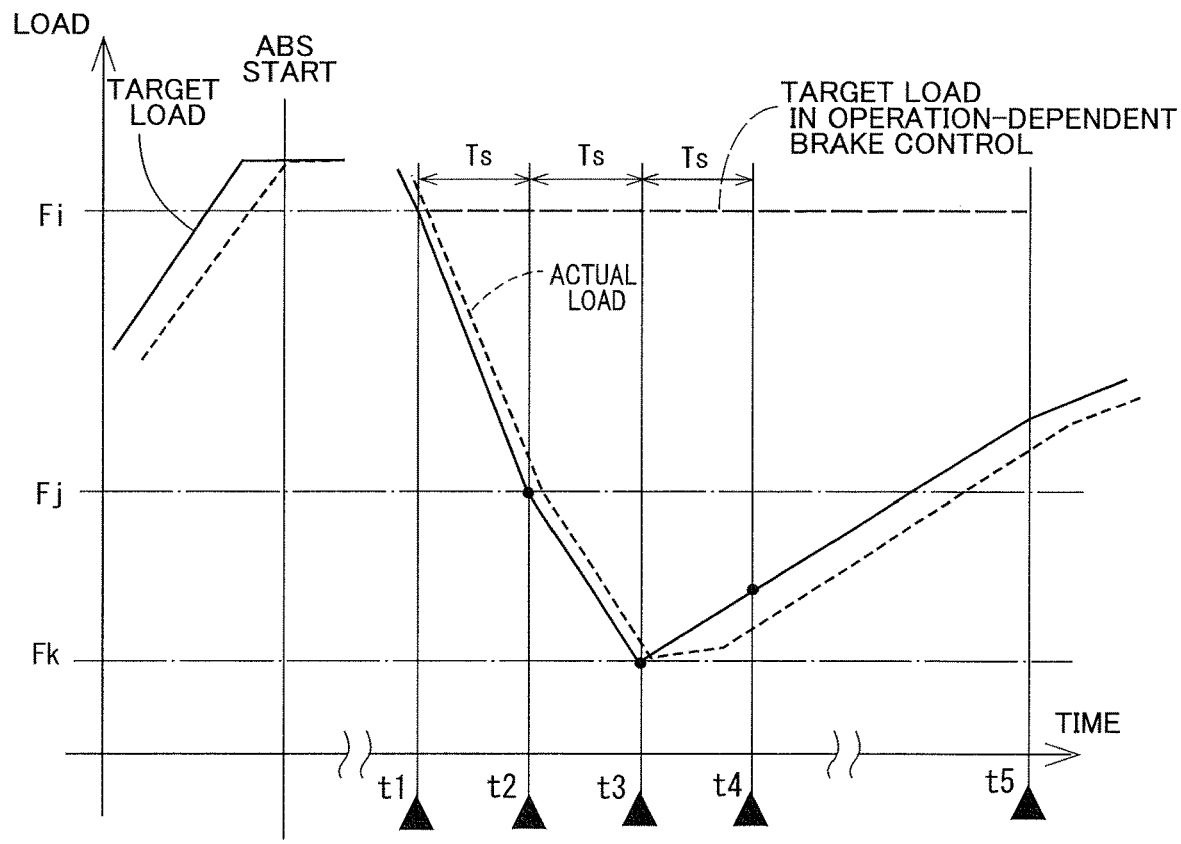
FIG. 17 is a view indicating changes in load in the case where the anti-lock control is executed for the electric brake.

FIG. 15 is a flowchart representing a motor control program that is executed each time when the control instruction is supplied from the brake ECU 110, in other words, each time when the set time Ts has elapsed. It is noted that the same step numbers as used in the flowchart in FIG. 6 are used to designate the corresponding processings in the flowchart in FIG. 15, and an explanation of which is dispensed with. In the present embodiment, when the control instruction supplied from the brake ECU 110 includes the sharp reduction mode, a pattern in the case where the sharp reduction mode is set according to the map in FIG. 14 is obtained at S29'. The duty control is executed at S41. As illustrated in FIG. 17, in a period of the reference time Tall, the reverse-rotation current ad and the forward-rotation current ah are alternately supplied for the reverse-rotation-current supply time tc and the forward-rotation-current supply time tg, respectively.

In the present embodiment, as illustrated in FIG. 17, load is changed, and it is possible to well reduce an undershoot.

In the present embodiment, the reverse-rotation-current supplier and the forward-rotation-current supplier are constituted by portions of the motor ECUs 112L, 112R which store and execute the processing at S41, for example.

It is to be understood that the disclosure is not limited to the details of the illustrated embodiments, but may be embodied with various changes and modifications, which may occur to those skilled in the art, without departing from the spirit and scope of the disclosure. For example, the return spring only needs to apply a force in the back direction to the pressing member 46 and is not limited to one that rotates the input shaft 70.

CLAIMABLE INVENTIONS

There will be explained claimable inventions.
(1) An electric-brake controller comprising an antilock controller configured to reduce slipping of a wheel under braking by controlling a pressing force of an electric brake comprising a pressing member that is advanced by rotation of an electric motor in a forward direction to press a friction member against a brake rotation member to reduce rotation of the wheel, the brake rotation member being configured to be rotated with the wheel, the pressing force being a force with which the pressing member presses the friction member against the brake rotation member,
wherein the electric brake comprises a return spring configured to apply a spring force such that the pressing member is moved away from the brake rotation member in a back direction,
wherein the antilock controller comprises a pressing-force reducer configured to reduce the pressing force, and
wherein the pressing-force reducer comprises:
a reverse-rotation-current supplier configured to supply reverse-rotation current for a reverse-rotation-current supply time, the reverse-rotation current being current causing the electric motor to rotate in a reverse direction reverse to the forward direction; and
a forward-rotation-current supplier configured to supply forward-rotation current to the electric motor after the reverse-rotation current is supplied by the reverse-rotation-current supplier for the reverse-rotation-current supply time, the forward-rotation current being current causing the electric motor to rotate in the forward direction.
(2) The electric-brake controller according to the above form (1), wherein the pressing-force reducer comprises a reverse-rotation-current supply-pattern determiner configured to determine at least one of the reverse-rotation-current supply time and a magnitude of the reverse-rotation current, based on (i) a target pressing force that is a target value of the pressing force and (ii) an actual pressing force that is an actual pressing force at a time of determination of the at least one of the reverse-rotation-current supply time and the magnitude of the reverse-rotation current.

For example, the reverse-rotation-current supply time may be longer in the case where a value obtained by subtracting the target pressing force from the actual pressing force is large than in the case where the value obtained by subtracting the target pressing force from the actual pressing force is small, and the magnitude of the reverse-rotation current may be larger in the case where the actual pressing force is large than in the case where the actual pressing force is small. This configuration well brings the actual pressing force closer to the target pressing force.

(3) The electric-brake controller according to the above form (1) or (2), wherein the pressing-force reducer comprises a forward-rotation-current determiner configured to determine a magnitude of the forward-rotation current, based on at least one of an actual pressing force and a target pressing force that is a target value of the pressing force For example, in the case where the pressing force is held, it is preferable to supply the forward-rotation current that can output a force that moves the pressing member in an advance direction and that is related to a force of the return spring which moves the pressing member in the back direction. The forward-rotation current in the case where the pressing force is held may be any of a value related to the target pressing force and a value related to the actual pressing force.

(4) The electric-brake controller according to any one of the above forms (1) through (3), wherein the pressing-force reducer comprises a target-pressing-force determiner configured to determine a target pressing force that is a target value of the pressing force, based on at least one of (a) an actual slipping state of the wheel under braking, (b) the pressing force in a case where control of the antilock controller is started, and (c) the pressing force that achieves a maximum braking force determined in an ideal slipping range.

It is known that a maximum braking force is obtained in the case where the slipping of the wheel under braking (e.g., a slip rate) falls within an ideal slipping range (e.g., 10% to 20%), for example. It is also known that the pressing force at the start of the anti-lock control is close to a pressing force that achieves the maximum braking force. A state of recovery of slipping of the wheel under braking is recognized based on the actual slipping state of the wheel under braking in the anti-lock control. In view of the above, the target pressing force is determined in the anti-lock control to a value that can achieve an optimum braking force at that time point. The target pressing force is preferably determined based at least one of the actual slipping state of the wheel under braking, the pressing force at the start of the anti-lock control, and the pressing force that achieves the maximum braking force. It is noted that the slipping state of the wheel under braking can be represented as a value relating to a difference between the speed of a vehicle body and the speed of rotation of the wheel. Examples of the value include a slip amount and a slip rate.

(5) The electric-brake controller according to any one of the above forms (1) through (4), wherein the antilock controller comprises at least one of (i) a slip-rate obtainer configured to obtain a slip rate as the slipping state of the wheel under braking and (ii) a pressing-force detector configured to detect the pressing force in the electric brake.

The slip-rate obtainer may include wheel speed sensors provided on front left and right and rear left and right wheels. The speed of the vehicle body is obtained based on the speeds of the respective front left and right and rear left and right wheels. The slip rate is obtained based on the speed of the vehicle body and the speed of each of the wheels.

(6) The electric-brake controller according to any one of the above forms (1) through (5),
wherein the antilock controller comprises a main controller configured to create an instruction for controlling the pressing force, each time when a predetermined set time has elapsed,
wherein the pressing-force reducer is configured to reduce the pressing force when a reduction instruction for reducing the pressing force is created by the main controller,
wherein the reverse-rotation-current supplier is configured to supply the reverse-rotation current to the electric motor for the reverse-rotation-current supply time, and
wherein the forward-rotation-current supplier is configured to supply the forward-rotation current until the predetermined set time has elapsed, after the reverse-rotation current is supplied by the reverse-rotation-current supplier for the reverse-rotation-current supply time.

The set time may be a cycle in which a brake-force control program is executed by the main controller. In this case, reduction and holding of the pressing force are performed in the set time, making it possible to well reduce an undershoot of the pressing force at the time point when the set time has elapsed. The control instruction (information or a signal) is created in the execution of the brake-force control program. The control instruction includes the target pressing force and the reduction instruction. It is noted that the main controller, the reverse-rotation-current supplier, and the forward-rotation-current supplier may be constituted by the same computer or different computers. In the case where the main controller, the reverse-rotation-current supplier, and the forward-rotation-current supplier are constituted by different computers, the control-instruction information created by the main controller is supplied to the reverse-rotation-current supplier and the forward-rotation-current supplier.

(7) The electric-brake controller according to any one of the above forms (1) through (5),
wherein the antilock controller comprises a main controller configured to create an instruction for controlling the pressing force, each time when a predetermined set time has elapsed, and
wherein supply of the reverse-rotation current by the reverse-rotation-current supplier and supply of the forward-rotation current by the forward-rotation-current supplier are alternately performed a plurality of times in the predetermined set time.

A reference time shorter than the predetermined set time is divided into the reverse-rotation-current supply time and the forward-rotation-current supply time. The supply of the reverse-rotation current and the supply of the forward-rotation current are alternately performed for the reference time. The alternate supply of the reverse-rotation current and the forward-rotation current in the reference time is repeatedly performed in the predetermined set time. That is, what is called duty control is executed.

(8) The electric-brake controller according to any one of the above forms (1) through (7),
wherein the electric-brake controller comprises an operation-dependent pressing-force controller configured to control the pressing force to a magnitude related to a state of operation of a brake operating member by a driver, and
wherein the pressing-force reducer is configured to reduce the pressing force at a rate greater than a maximum value of a rate at which the pressing force is reduced by the operation-dependent pressing-force controller.

(9) The electric-brake controller according to the above form (8), wherein the operation-dependent pressing-force controller comprises a forward-rotation-current reducer configured to reduce the forward-rotation current to be supplied to the electric motor, when the pressing force is reduced.

The reduction rate of the pressing force in the case where an operating force applied to the brake operating member is reduced by a driver at the maximum speed can be achieved by reduction of positive current.

(10) The electric-brake controller according to any one of the above forms (1) through (9), wherein the antilock controller configured to:
determine the reverse-rotation-current supply time, each time when the predetermined set time has elapsed; and
execute feedforward control for reducing the pressing force for the reverse-rotation-current supply time.

The reverse-rotation-current supply time may be a time that is longer in the case where a value obtained by subtracting the target pressing force from the actual pressing force is large than in the case where the value is small, for example. In the present electric-brake controller, in the case where the reverse-rotation-current supply time has passed, the supply of the reverse-rotation current is stopped independently of the magnitude of the pressing force at the time point when the reverse-rotation-current supply time has elapsed.

(11) An electric-brake controller comprising an antilock controller configured to reduce slipping of a wheel under braking by controlling a pressing force of an electric brake comprising a pressing member that is advanced by rotation of an electric motor in a forward direction to press a friction member against a brake rotation member to reduce rotation of the wheel, the brake rotation member being configured to be rotated with the wheel, the pressing force being a force with which the pressing member presses the friction member against the brake rotation member,
wherein the electric brake comprises a return spring configured to apply a spring force such that the pressing member is moved away from the brake rotation member in a back direction,
wherein the antilock controller comprises: a pressing-force reducer configured to reduce the pressing force; and a pressing-force holder configured to hold the pressing force,
wherein the pressing-force reducer comprises a reverse-rotation-current supplier configured to supply reverse-rotation current that causes the electric motor to rotate in a reverse direction reverse to the forward direction, and
wherein the pressing-force holder comprises a forward-rotation-current supplier configured to supply forward-rotation current to the electric motor without an advance the pressing member, after the reverse-rotation current is supplied by the reverse-rotation-current supplier, the forward-rotation current being current in a direction in which rotation of the electric motor in the forward direction is caused.

The present electric-brake controller may incorporate the technical features according to any one of the above forms (1) through (10).

(12) A vehicle brake system, comprising:

an electric brake comprising a pressing member that is advanced by rotation of an electric motor in a forward direction to press a friction member against a brake rotation member to reduce rotation of a wheel, the brake rotation member being configured to be rotated with the wheel; and an electric-brake controller comprising an antilock controller configured to reduce slipping of the wheel under braking by controlling a pressing force with which the pressing member presses the friction member against the brake rotation member, wherein the electric brake comprises a return spring configured to apply a spring force such that the pressing member is moved away from the brake rotation member in a back direction, wherein the antilock controller comprises a pressing-force reducer configured to reduce the pressing force, and wherein the pressing-force reducer comprises:

a reverse-rotation-current supplier configured to supply reverse-rotation current for a reverse-rotation-current supply time, the reverse-rotation current being current causing the electric motor to rotate in a reverse direction reverse to the forward direction; and a forward-rotation-current supplier configured to supply forward-rotation current to the electric motor after the reverse-rotation current is supplied by the reverse-rotation-current supplier for the reverse-rotation-current supply time, the forward-rotation current being current causing the electric motor to rotate in the forward direction.

The present vehicle brake system may incorporate the technical features according to any one of the above forms (1) through (11).

What is claimed is:

1. An electric-brake controller comprising an antilock controller configured to reduce slipping of a wheel under braking by controlling a pressing force of an electric brake comprising a pressing member that is advanced by rotation of an electric motor in a forward direction to press a friction member against a brake rotation member to reduce rotation of the wheel, the brake rotation member being configured to be rotated with the wheel, the pressing force being a force with which the pressing member presses the friction member against the brake rotation member, wherein the electric brake comprises a return spring configured to apply a spring force such that the pressing member is moved away from the brake rotation member in a back direction, wherein the antilock controller comprises a pressing-force reducer configured to reduce the pressing force, wherein the pressing-force reducer comprises:

a reverse-rotation-current supplier configured to supply reverse-rotation current for a reverse-rotation-current supply time, the reverse-rotation current being current causing the electric motor to rotate in a reverse direction reverse to the forward direction; and a forward-rotation-current supplier configured to supply forward-rotation current to the electric motor after the reverse-rotation current is supplied by the reverse-rotation-current supplier for the reverse-rotation-current supply time, the forward-rotation current being current causing the electric motor to rotate in the forward direction, wherein the electric-brake controller comprises an operation-dependent pressing-force controller configured to control the pressing force to a magnitude related to a state of operation of a brake operating member by a driver, and wherein the pressing-force reducer is configured to reduce the pressing force at a rate greater than a maximum value of a rate at which the pressing force is reduced the pressing force at a rate greater than a maximum value of a rate at which the pressing force is reduced by the operation-dependent pressing-force controller.

2. The electric-brake controller according to claim 1, wherein the pressing-force reducer comprises a reverse-rotation-current supply-pattern determiner configured to determine the reverse-rotation-current supply time, based on (i) a target pressing force that is a target value of the pressing force and (ii) an actual pressing force that is an actual pressing force at a time of determination of reverse-rotation-current supply time.

3. The electric-brake controller according to claim 2, wherein the reverse-rotation-current supply-pattern determiner is configured to:

determine the reverse-rotation-current supply time to a time that increases as the difference between the target pressing force and the actual pressing force increases; and determine a magnitude of the reverse-rotation current to a value that increases as the actual pressing force increases.

4. The electric-brake controller according to claim 1, wherein the pressing-force reducer comprises a forward-rotation-current determiner configured to determine a magnitude of the forward-rotation current, based on at least one of an actual pressing force and a target pressing force that is a target value of the pressing force.

5. The electric-brake controller according to claim 1, wherein the pressing-force reducer comprises a target-pressing-force determiner configured to determine a target pressing force that is a target value of the pressing force, based on at least one of (a) an actual slipping state of the wheel under braking, (b) the pressing force in a case where control of the antilock controller is started, and (c) the pressing force that achieves a maximum braking force determined in an ideal slipping range.

6. The electric-brake controller according to claim 1, wherein the antilock controller comprises a main controller configured to create an instruction for controlling the pressing force, each time when a predetermined set time has elapsed, wherein the pressing-force reducer is configured to reduce the pressing force when a reduction instruction for reducing the pressing force is created by the main controller, wherein the reverse-rotation-current supplier is configured to supply the reverse-rotation current to the electric motor for the reverse-rotation-current supply time, and wherein the forward-rotation-current supplier is configured to supply the forward-rotation current until the predetermined set time has elapsed, after the reverse-rotation current is supplied by the reverse-rotation-current supplier for the reverse-rotation-current supply time.

7. The electric-brake controller according to claim 1,
wherein the antilock controller comprises a main controller configured to create an instruction for controlling the pressing force, each time when a predetermined set time has elapsed,
wherein the pressing-force reducer is configured to reduce the pressing force when a reduction instruction for reducing the pressing force is created by the main controller,
wherein supply of the reverse-rotation current by the reverse-rotation-current supplier and supply of the forward-rotation current by the forward-rotation-current supplier are alternately performed a plurality of times in the predetermined set time.

8. The electric-brake controller according to claim 1, wherein the antilock controller configured to:
determine the reverse-rotation-current supply time, each time when the predetermined set time has elapsed; and
execute feedforward control for reducing the pressing force for the reverse-rotation-current supply time.

9. An electric-brake controller comprising an antilock controller configured to reduce slipping of a wheel under braking by controlling a pressing force of an electric brake comprising a pressing member that is advanced by rotation of an electric motor in a forward direction to press a friction member against a brake rotation member to reduce rotation of the wheel, the brake rotation member being configured to be rotated with the wheel, the pressing force being a force with which the pressing member presses the friction member against the brake rotation member,
wherein the electric brake comprises a return spring configured to apply a spring force such that the pressing member is moved away from the brake rotation member in a back direction,
wherein the antilock controller comprises a pressing-force reducer configured to reduce the pressing force,
wherein the pressing-force reducer comprises:
a reverse-rotation-current supplier configured to supply reverse-rotation current for a reverse-rotation-current supply time, the reverse-rotation current being current causing the electric motor to rotate in a reverse direction reverse to the forward direction; and
a forward-rotation-current supplier configured to supply forward-rotation current to the electric motor after the reverse-rotation current is supplied by the reverse-rotation-current supplier for the reverse-rotation-current supply time, the forward-rotation current being current causing the electric motor to rotate in the forward direction, and
wherein the antilock controller configured to:
determine the reverse-rotation-current supply time, each time when the predetermined set time has elapsed; and
execute feedforward control for reducing the pressing force for the reverse-rotation-current supply time.

10. A vehicle brake system, comprising:
an electric brake comprising a pressing member that is advanced by rotation of an electric motor in a forward direction to press a friction member against a brake rotation member to reduce rotation of a wheel, the brake rotation member being configured to be rotated with the wheel; and
an electric-brake controller comprising an antilock controller configured to reduce slipping of the wheel under braking by controlling a pressing force with which the pressing member presses the friction member against the brake rotation member,
wherein the electric brake comprises a return spring configured to apply a spring force such that the pressing member is moved away from the brake rotation member in a back direction,
wherein the antilock controller comprises a pressing-force reducer configured to reduce the pressing force,
wherein the pressing-force reducer comprises:
a reverse-rotation-current supplier configured to supply reverse-rotation current for a reverse-rotation-current supply time, the reverse-rotation current being current causing the electric motor to rotate in a reverse direction reverse to the forward direction; and
a forward-rotation-current supplier configured to supply forward-rotation current to the electric motor after the reverse-rotation current is supplied by the reverse-rotation-current supplier for the reverse-rotation-current supply time, the forward-rotation current being current causing the electric motor to rotate in the forward direction,
wherein the electric-brake controller comprises an operation-dependent pressing-force controller configured to control the pressing force to a magnitude related to a state of operation of a brake operating member by a driver, and
wherein the pressing-force reducer is configured to reduce the pressing force at a rate greater than a maximum value of a rate at which the pressing force is reduced by the operation-dependent pressing-force controller.

11. A vehicle brake system, comprising:
an electric brake comprising a pressing member that is advanced by rotation of an electric motor in a forward direction to press a friction member against a brake rotation member to reduce rotation of a wheel, the brake rotation member being configured to be rotated with the wheel; and
an electric-brake controller comprising an antilock controller configured to reduce slipping of the wheel under braking by controlling a pressing force with which the pressing member presses the friction member against the brake rotation member,
wherein the electric brake comprises a return spring configured to apply a spring force such that the pressing member is moved away from the brake rotation member in a back direction,
wherein the antilock controller comprises a pressing-force reducer configured to reduce the pressing force,
wherein the pressing-force reducer comprises:
a reverse-rotation-current supplier configured to supply reverse-rotation current for a reverse-rotation-current supply time, the reverse-rotation current being current causing the electric motor to rotate in a reverse direction reverse to the forward direction; and
a forward-rotation-current supplier configured to supply forward-rotation current to the electric motor after the reverse-rotation current is supplied by the reverse-rotation-current supplier for the reverse-rotation-current supply time, the forward-rotation current being current causing the electric motor to rotate in the forward direction, and
wherein the antilock controller configured to:
determine the reverse-rotation-current supply time, each time when the predetermined set time has elapsed; and execute feedforward control for reducing the pressing force for the reverse-rotation-current supply time.

* * * * *